April 11, 1950

L. C. SHAMEL 2,503,420

FISHHOOK EXTRACTOR

Filed April 24, 1948

Inventor
LOWELL C. SHAMEL

Attorney

Patented Apr. 11, 1950

2,503,420

UNITED STATES PATENT OFFICE 2,503,420

FISHHOOK EXTRACTOR

Lowell C. Shamel, Davison, Mich.

Application April 24, 1948, Serial No. 22,972

1 Claim. (Cl. 43—53.5)

This invention relates to a fish hook extractor and particularly to a type thereof having means for engaging and following the fish line from any convenient point down to the hook and thence effecting firm engagement of the hook for convenient removal thereof from the fish's mouth.

In the many types of devices for the engaging of a fish hook and assisting the fisherman in extracting the hook from the fish's mouth, there are many which employ the principle of engaging the line, and upon proper manipulation by the fisherman, following it down to the hook. However, in many of these there is required a further manipulation when the extractor reaches the hook for the purpose of transferring the engagement of the extractor from the line to the hook. This varies from difficult to impossible depending on how far down the fish's throat the hook is located, and is further difficult when for other reasons, such as when fishing at night, it is not possible to see the hook. Other types of extractors employing this general principle often require a two handed manipulation which is difficult to carry out when the fish is unwilling to rest quietly.

Various other difficulties in presently known devices of this general type are now present and it is the purpose of this invention to eliminate these difficulties and to provide a fish hook extractor which is economical to fabricate and which is convenient to use and positive in its operation.

Accordingly, a principal object of the invention is to provide a fish hook extractor of the general type which engages the fish line for following the same down to the hook and which when it meets said hook will engage same without repositioning and without the necessity of the operator seeing the hook.

A further object of the invention is to provide a fish hook extractor of the type mentioned which will automatically force the fish's mouth open as it enters same for engagement with the hook.

A further object of the invention is to provide a fish hook extractor of the type mentioned which will be useable on a wide variety of sizes of hooks without material change in manner, convenience or effectiveness of operation from one size of hook to another.

A further object of the invention is to provide a fish hook extractor of the general type mentioned which will act through the hook itself to engage the fish with sufficient positiveness to assist the fisherman in gripping its body.

A further object of the invention is to make a fish hook extractor of the general type mentioned foregoing which is economical to fabricate but which will be sturdy and capable of withstanding long and rigorous use.

Other objects and purposes of the invention will be apparent to persons acquainted with devices of this general kind upon reading the following disclosure and inspecting the accompanying drawings.

In meeting the objects and purposes above named, I have provided a fish hook extractor which is preferably made from a single piece of wire bent into a substantially pistol shape and having a single loop at the muzzle end, which loop acts both as a line guide and hook engaging means. With the line passing through the loop, which loop is substantially closed except only for sufficient space to permit the entry of said line thereinto, said loop will follow the line as far as necessary and ultimately engage the hook regardless of the direction in which the hook is placed. With the line then wrapped one or two turns around the extractor, a rigid engagement is obtained on the line, the hook and the fish.

While it is recognized that a fish hook extractor employing the general principles of my invention may be made in several forms, and with several modifications as to size, precise shape and materials, one preferred embodiment thereof has been selected as illustrative of the principles of my invention and is illustrated in the accompanying drawings.

Figure 1:
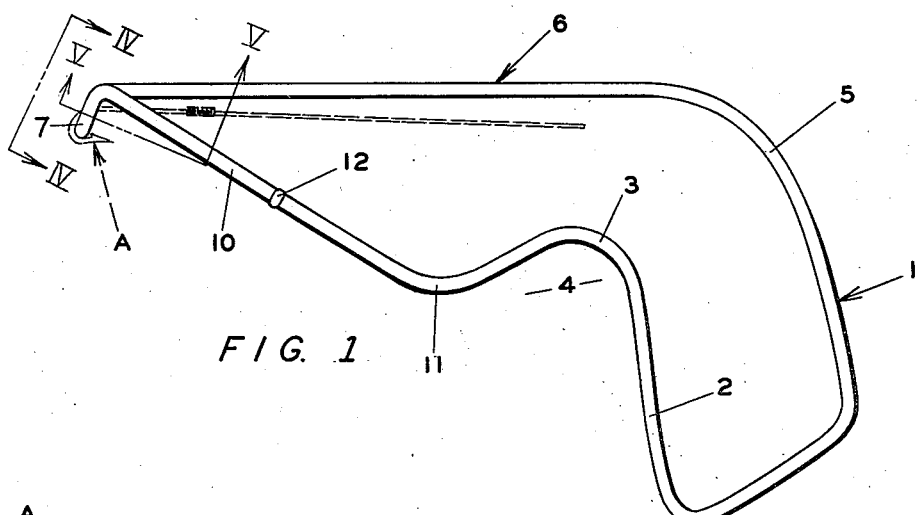
Figure 1 is a side view of a fish hook extractor embodying my invention and showing in broken lines a fishing line and a fish hook in operative relationship thereto.
Figure 3:
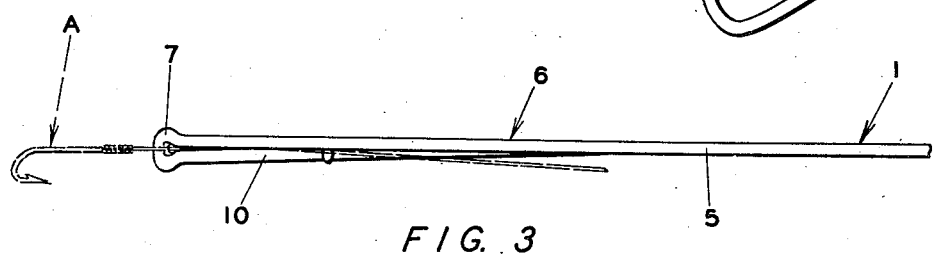
Figure 3 is a top view of the fish hook extractor shown in Figure 1 and showing in broken lines a fishing line and fish hook as the extractor is following said line and approaching said hook.
Figure 2:
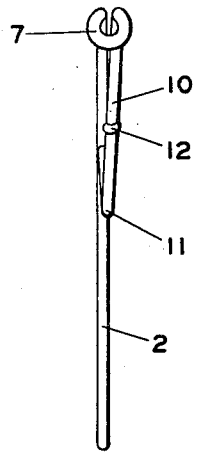
Figure 2 is an end view of the fish hook extractor shown in Figure 1 taken from the left as same appears in Figure 1.

As shown in the drawings, the fish hook extractor of my invention is made from a single piece of suitably bent wire, but it will be understood that the exact nature and size of wire may be freely varied according to the size of fish hook extractor required and the nature of its anticipated use. For example, a fish hook extractor for general use with small game fish, such as trout, perch, blue gills and moderate size bass, fabricated from copper coated steel wire, having a diameter of 0.080 inch, will be found suitable. For salt water use, the wire may be somewhat modified as to material and for substantially larger fish the wire will be of heavier gauge.

Due to the similarity in general outline between my fish hook extractor and a pistol, a number of pistol terms for the designation of parts of the extracting device will be used for convenience in reference in the following description.

Generally speaking, the device is comprised of a handle, a barrel part extending from the handle and a line and hook engaging member including a loop at the muzzle of the barrel. To form this of wire, a suitable section thereof is bent to form a convenient gripping handle 1 including a finger engaging portion 2 and a reverse bend 3 to provide a line securing recess 4. From the upper end and back of the handle 5 there extends a straight top barrel portion 6 which extends for a substantial distance, said distance being approximately six inches in the particular embodiment herein chosen for illustrative purposes.

Figure 4:
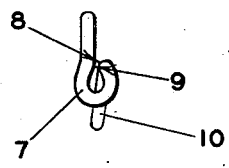
Figure 4 is a fragmentary view taken from the plain indicated by the line IV—IV of Figure 1 showing the exact contour of the preferred form of line and hook engaging loop.

At the muzzle end of the device, the wire is bent at the point 9 laterally slightly outside of the general plane of the whole device, as best shown in Figure 4, and thence through an angle approximately 75 degrees. The amount of this bend may however, vary widely between at least 60 and 90 degrees without destroying the effectiveness of my device, although wide variations from said angle will somewhat hamper the ease of operation.

Said wire is then bent into a substantially closed loop 7 as appearing in Figure 4 to a point 8 which is spaced from the opposed portion 9 a distance only sufficient to permit the passage therebetween of the fish line with which this extractor is to be used. At this point said wire is bent through a substantially 90 degree angle and extends at a rather substantial angle, here approximately 30 degrees, with respect to the top barrel defining portion 6 to constitute the lower barrel portion 10. Said last named portion extends to a point 11 near the handle and is then bent upwardly toward the upper side 6 of the pistol barrel to join the portion 3 which defines a line securing recess 4.

The wire may be fastened together at its abutting ends in any convenient manner and the abutting ends may occur in substantially any place excepting at the loop 7. In this embodiment the ends of the wire are shown meeting at 12 in the trigger guard portion of the pistol construction and are fastened together by brazing.

It will be evident that the handle, barrel and trigger guard portions of the construction may be varied rather widely to meet the convenience of the user without departing from the scope of my invention. However, the loop 7 should not be varied greatly from that here shown, and particularly its maximum diameter should always remain smaller than the distance between the barb and the shank of the smallest hook with which it is intended to be used. This is not, of course, to say that the extractor will not work with hooks having a smaller distance between shank and barb than the diameter of said loop but rather that it will not work with maximum effectiveness.

The angle between the upper barrel defining part 6 and the lower barrel defining part 10 may be somewhat varied, but it should remain rather substantial, such as between about 20 degrees and about 50 degrees, inasmuch as this divergence of parts is relied upon to force open the fish's mouth by which to effect easier entry of the extractor thereinto and the more ready removal of the hook therefrom.

Operation

The use of this extractor is exceedingly simple and has already been substantially indicated in the foregoing description of this construction. Holding the line in one hand and the extractor in the other, a portion of the line is caused to pass between the opposed loop parts 8 and 9 by which said line is introduced into the loop 7. Since the parts 8 and 9 are sufficiently close together that the line must be slightly forced to pass therebetween, it will remain within said loop and will not normally escape therefrom. Still holding the line in one hand and the extractor in the other hand, the extractor is then caused to follow down the line to the hook. This may be done with the fish still in the net, in the bottom of the boat or even in the water, according to circumstances and convenience. As the loop 7 reaches the shank of the hook it will pass thereover and continue on in the same manner as it followed the line. However, in the case of either the shank of the hook or a leader, these are normally slightly larger than the line so that there is practically no likelihood at all of a leader or hook shank escaping from the loop through the opening between the parts 8 or 9. As the loop 7 reaches the curved part, or crook, of the hook it will engage same in the manner shown in Figure 1 regardless of the direction assumed thereby. Even if such curved part of the hook should happen to fall against the opening between the parts 8 and 9, it will not pass therethrough inasmuch as, as above pointed out, such parts are substantially larger than the line with which they are used, and therefore, too large to go between said parts 8 and 9.

Figure 5:
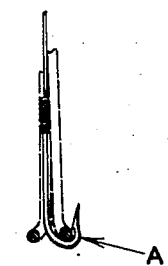
Figure 5 is a sectional view taken along the line V—V of Figure 1 but showing the extractor in broken lines and the hook in solid lines, with said hook rotated 90 degrees.

The line is then wrapped with one or two turns around the extractor, usually utilizing the recess 4 so that when it is again grasped by the hand holding the extractor it will be snugly held there against and the hook itself rigidly held against the loop 7. With the hand which has been manipulating the line thusly freed, it is a simple procedure for the fisherman with that hand to grasp the fish, push the extractor slightly further into the fish's mouth and thereby release the hook. Because the normal contour of fish hooks is such that the lowest part of the bent portion is closely adjacent the pointed and barbed portion, the loop 7 will assume a position closely adjacent thereto as indicated at A in Figure 5. Thus, in withdrawing the extractor and engaged hook from the fish's mouth, the point of the hook lies close to the extractor and there is very little, if any, opportunity for it again to pierce the fish upon removal excepting only when it is extremely deep in the fish's throat and even then if such happens it can easily be again disengaged. Here it should be noted, however that when the loop 7 is any material distance into the fish, as would be the case with the hook in the fish's throat, the parts 6 and 10 force the fish's mouth sufficiently wide that the maximum working space is provided and thus the chances are minimized that the hook will again catch. This is of particular importance when removing hooks from undersize fish in that, with a device as here illustrated and described, a hook, which is so far into a fish's throat that it will cause the death of said fish to remove such hook by ordinary methods, may be safely removed by my herein disclosed extractor without injuring said fish and it may be safely returned to the water. This is an obvious advantage in preserving small fish, and also to encourage those sportsmen who want only the sport of catching fish and who would thus be inclined to return the small fish to the water after catching them if the hook could be removed without substantial injury to the fish.

It will be evident that while the above described wire construction will be a highly economical, effective and fully satisfactory method of fabricating my improved extractor, other constructional possibilities will be at once recognized and will be within the scope of the invention. For example, instead of the contour illustrated in Figure 1 being merely outlined by a wire, as shown, the handle and barrel parts of the device could be presented by a solid piece of metal, wood or plastic having the illustrated contour and carrying wires in the manner shown only in the portion defining the loop 7 and immediately associated therewith.

Accordingly, I have disclosed and described a fish hook extractor having the advantages above set forth, as well as various other advantages which will be evident to anyone acquainted with equipment of this type. Variations may be made in the specific construction of the device as described without departing from the scope of the invention and therefore the hereinafter appended claim should be closely limited in their interpretation only where their express language requires.

I claim:

A fish hook extractor comprising a single piece of wire having a shape such that a fold of the wire is of U-shape and corresponds in outline to the outline of a pistol handle, one of the legs of the U having an extension at an obtuse angle to that leg portion and provided with a loop of substantially annular formation at a location opposite to said leg portion, one end of the loop being opposite the extension and having a bend of 90 degrees, one portion of the bend extending at an acute angle to the first extension and then upwardly to merge with the other leg of the handle, the substantially annular loop constituting a line receiving recess and a holder for the bite portion of a fishing hook secured to said line.

LOWELL C. SHAMEL.

REFERENCES CITED

The following references are of record in the file of this patent:

UNITED STATES PATENTS

| Number | Name | Date |
|---|---|---|
| 1,543,144 | Wurm | June 23, 1925 |
| 2,155,898 | Harkins | Apr. 25, 1939 |

FOREIGN PATENTS

| Number | Country | Date |
|---|---|---|
| 623,872 | France | Mar. 28, 1927 |